(12) United States Patent
Kerres

(10) Patent No.: US 6,509,441 B1
(45) Date of Patent: Jan. 21, 2003

(54) MODIFIED POLYMER AND MODIFIED POLYMER MEMBRANES

(75) Inventor: Jochem Kerres, Stuttgart (DE)

(73) Assignee: Universität Stuttgart, Stuttgard (DE)

( * ) Notice: Subject to any disclaimer, the term of this patent is extended or adjusted under 35 U.S.C. 154(b) by 0 days.

(21) Appl. No.: 09/669,989

(22) Filed: Sep. 26, 2000

Related U.S. Application Data

(63) Continuation of application No. PCT/DE99/00929, filed on Mar. 26, 1999.

(30) Foreign Application Priority Data

Mar. 27, 1998 (DE) .......................................... 198 13 613

(51) Int. Cl.[7] .............................................. C08G 75/20
(52) U.S. Cl. ....................... 528/391; 528/223; 528/224; 528/486; 528/487; 528/491; 528/492; 525/328.6; 525/471; 210/650
(58) Field of Search ................................. 528/391, 223, 528/224, 486, 487, 491, 492; 525/328.6, 471; 210/650

(56) References Cited

U.S. PATENT DOCUMENTS

| | | | |
|---|---|---|---|
| 4,086,209 A | 4/1978 | Hara et al. | |
| 5,026,494 A | 6/1991 | Denzinger et al. | |
| 5,082,565 A | 1/1992 | Haubs et al. | |
| 5,438,082 A | 8/1995 | Helmer-Metzmann et al. | |
| 5,449,775 A | 9/1995 | Bruchmann et al. | |
| 5,561,202 A | 10/1996 | Helmer-Metzmann et al. | |
| 5,565,527 A | 10/1996 | Bruchmann et al. | |
| 5,637,664 A | 6/1997 | Bruchman et al. | |
| 5,741,408 A | 4/1998 | Helmer-Metzmann et al. | |

FOREIGN PATENT DOCUMENTS

| | | |
|---|---|---|
| EP | 0013000 | 7/1980 |
| EP | 0325405 | 7/1989 |
| EP | 0506611 | 9/1991 |
| EP | 0572995 | 12/1993 |
| EP | 0574791 | 12/1993 |
| JP | 51138792 | 11/1976 |

OTHER PUBLICATIONS

Karcha, R.J. and Porter, R.S., "Preparation and Characterization of Nitrated Poly (Aryl Ethyl Ketone)", *J.M.S.—Pure Appl. Chem.*, A35(5): 957–967 (1995).
Corfield, G.C., et al., "Synthesis and Colorimetric Curling Study of Amino–Terminated PEEK Oligomers", *J. of Polymer Sci.: Part A: Polymer Chem.*, 30:845–849 (1992).
Naik, H.A., et al., "Chemical modification of polyarylene ether/sulphone polymers: preparation and properties of materials aminated on the main chain", *Polymer*, 32(1): 140–145 (1991).
Dewez, J.L., et al., "Surface study of new microporous polymeric membranes used as a substratum for animal cell culture", *Interfaces New Mater.* [*Proc. Workshop*], eds. Grange, P. et al., Elsevier, London, UK, pp. 84–94 (1991, Meeting Date 1990).
Bauer, B. and Strathmann, H., "Ion Exchange Membranes", *8th European Summer School in Membrane Science: Transport, Mechanical and Physical Properties of Membranes*, Villa Feltrinelli, Gargnano, Italy (Sep. 17–21, 1990).
Daly, W.H. et al., in *Chemical Reactions in Polymers*, Benham, J.L. and Kinstle, J.F. eds., ACS Symp. Ser., p. 364 (1988).
Crivello, J.V., "Nitrations and Oxidation with Inorganic Nitrate Salts in Trifluorocetic Anhydride", *J. Org. Chem.*, 46: 3056–3060 (1981).

Primary Examiner—Duc Truong
(74) Attorney, Agent, or Firm—Baker Botts L.L.P.

(57) ABSTRACT

The present invention provides novel, economic processes for preparing nitrated and sulfonated polymers and aminated and sulfonated polymers. Also provided are the polymers prepared by these processes. The invention also provides for membranes comprising the polymers, methods for preparing the membranes and their use in electromembrane processes, particularly in fuel cells.

26 Claims, 4 Drawing Sheets

Preparation of nitrated PEEK

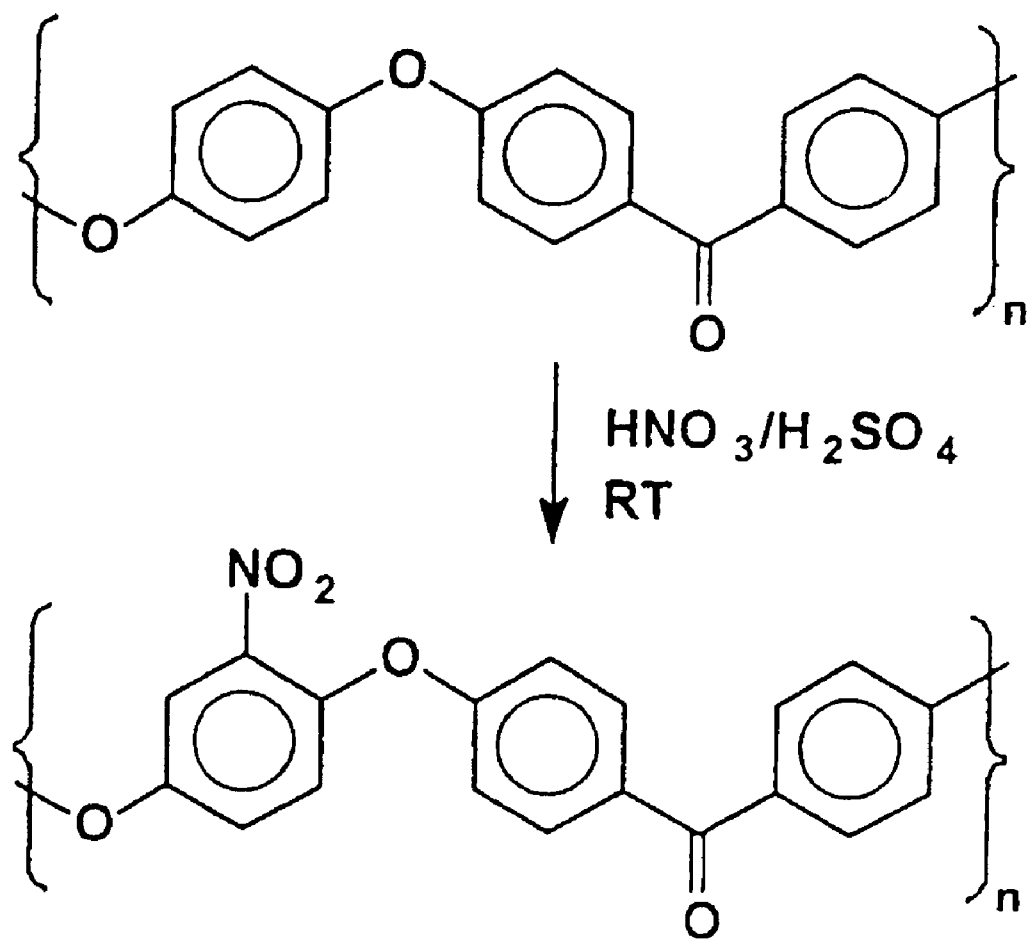
Fig. 1: Preparation of nitrated PEEK

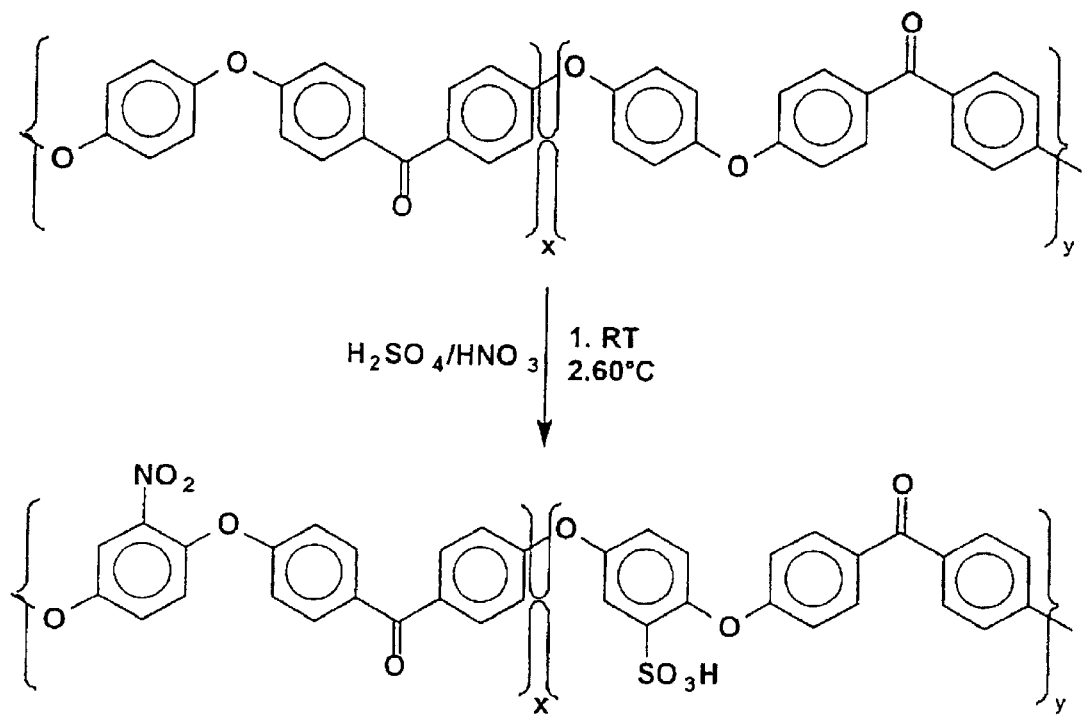
Fig. 2: Preparation of nitrated and sulfonated PEEK

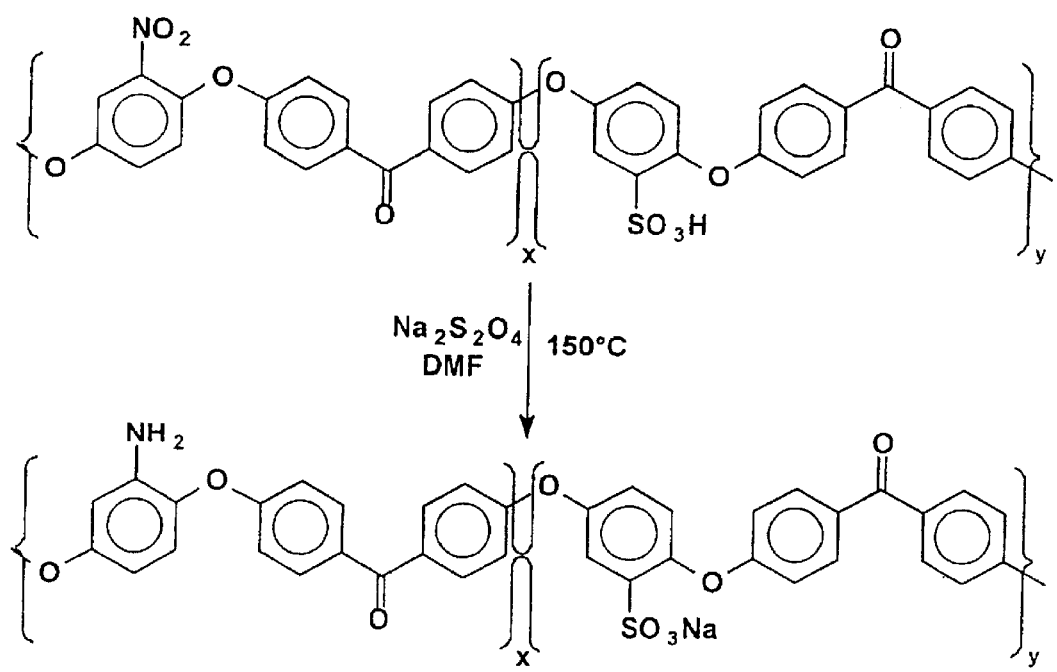
Fig. 3: Aminated and sulfonated PEEK from sulfonated and nitrated PEEK

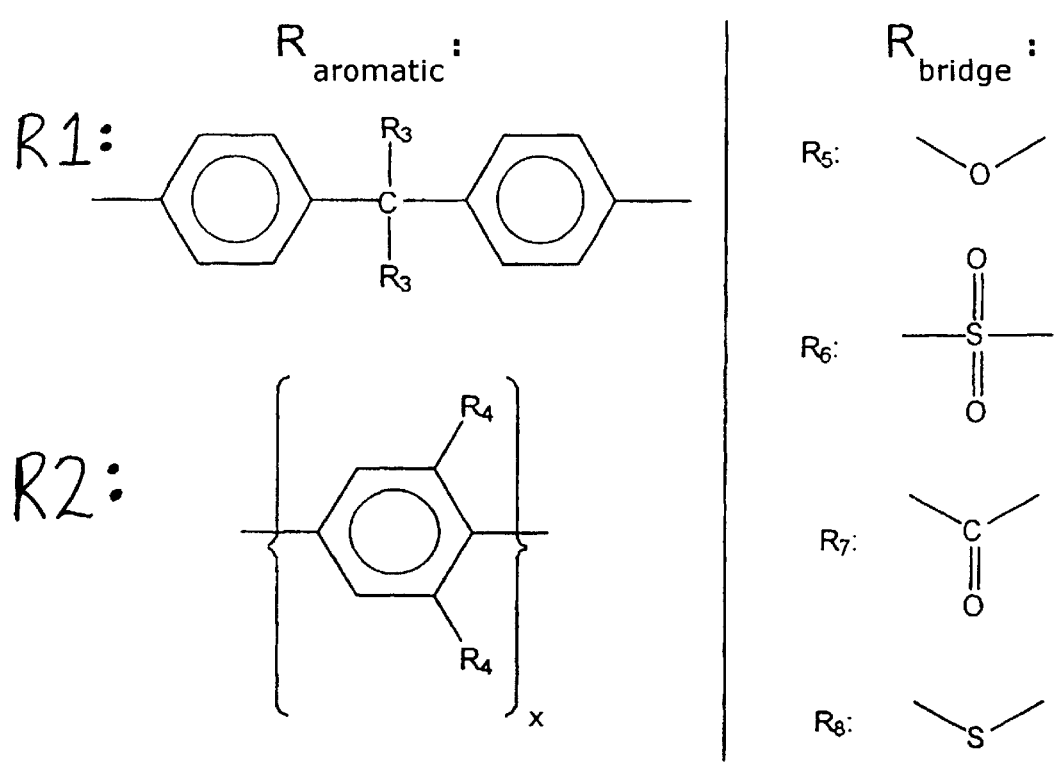
Fig. 4: Structural units of polymers having aryl backbone chains

MODIFIED POLYMER AND MODIFIED POLYMER MEMBRANES

This application is a continuation of application Ser. No. PCT/DE99/00929, filed Mar. 26, 1999.

BACKGROUND OF THE INVENTION

1. Subject Matter of the Invention

The subject of the invention are novel, very economic processes for the preparation of:

nitrated aryl polymers and optionally aminated aryl polymers prepared therefrom by a reduction of the nitro group;

aryl polymers containing both nitro groups and sulfonic acid groups or both amino groups and sulfonic acid groups.

The subject of the invention are also novel, modified aryl polymers which can be produced very economically and aryl polymer membranes produced therefrom:

a nitrated aryl polymer and an aminated aryl polymer which can be produced therefrom;

a nitrated and sulfonated aryl polymer;

an aminated and sulfonated aryl polymer;

membranes made from the novel aryl polymers and blends of the polymers of the invention with additional polymers.

In addition, the subject of the invention is the application of the newly developed aryl polymers in membrane processes, in particular as polymeric electrolytes in electromembrane processes, e.g., in electrodialysis and in the PEM membrane fuel cell. Since the inventive membranes have high chemical and thermal stabilities, they are an economical alternative to the very expensive perfluorinated ionomeric membranes of the Nafion type which have mainly been used in PEM fuel cells up to the present.

2. The State of the Art

[Ref. 1] describes the preparation of nitrated poly (etheretherketone) (PEEK-$NO_2$) by dissolving the PEEK in methanesulfonic acid and subsequently nitrating by adding concentrated nitric acid. A drawback of this process is the use of the relatively expensive methanesulfonic acid as the solvent.

[Ref. 2] describes the preparation of amino-terminated poly(etheretherketone) oligomers by the nucleophilic displacement reaction of 4,4'-difluorobenzophenone by hydroquinone in the presence of a calculated excess of m-aminophenol. A drawback of said oligomers is a low amino group content, since only the terminal groups are modified by amino groups. There exist various patents for the preparation of sulfonated poly(etheretherketone) by dissolving the PEEK in concentrated sulfuric acid, with [Ref. 3] being one example thereof. In [Ref. 3], however, only sulfonated poly(etheretherketones) are disclosed.

Naik et al. [Ref. 4] describe the preparation and the properties of backbone-aminated poly(ether sulfone) (PES) and poly(etherether sulfone) (PEES), where the aminated polymer has been prepared by the nitration of the base polymer using nitrating acid ($HNO_3$/ $H_2SO_4$) in nitrobenzene as the solvent and the subsequent reduction of the nitro group to the amino group. A drawback of this process is the toxicity of the nitrobenzene solvent.

There are numerous works regarding the nitration of aryl polymers, of which the works of Crivello [Ref. 5] and Daly [Ref. 6] may be mentioned here. The authors use ammonium nitrate and trifluoroacetic anhydride as nitrating agents. The drawback of this method is the high cost of trifluoroacetic anhydride and the liability to explosion of ammonium nitrate.

SUMMARY OF THE INVENTION

The present invention provides sulfonated and nitrated polymers having an aryl backbone comprising a plurality of aryl groups R1, R2, or both, connected by bridging groups selected from the group consisting of $R_5$, $R_6$, $R_7$ and R8; wherein:

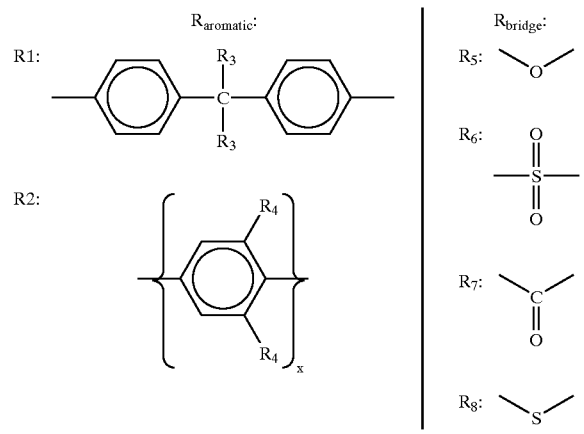

$R_3$, and $R_4$ H, methyl, or 4-phenoxybenzoyl, and x=1 or 2, said polymer having at least a portion of the aryl groups of the backbone substituted with —$SO_3H$ and at least a portion of the aryl groups of the backbone substituted with —$NO_2$.

The invention also provides for processes for producing the sulfonated and nitrated polymers.

The invention further provides aminated and sulfonated polymers prepared by reduction of the nitrated and sulfonated polymers, containing primary amino groups in place of the nitro groups on the aryl backbone. In addition, the invention further provides aminated and sulfonated polymers having secondary or tertiary amines or quaternary ammonium groups prepared by alkylation of the primary amines on the aminated and sulfonated polymers.

The polymers of the invention can be combined with additional polymers to form polymer blends.

A still further aspect of the invention provides for membranes comprising the polymers and polymer blends and a process for producing the membranes from the polymers of the invention and polymer blends.

A further object of the invention is the use of such membranes in electromembrane processes, e.g., in electrodialysis and in membrane fuel cells composed of the membranes of the invention.

BRIEF DESCRIPTION OF THE DRAWINGS

The present invention may be better understood by reference to the attached drawings in which:

FIG. 1 depicts preparation of nitrated PEEK;

FIG. 2 depicts preparation of nitrated and sulfonated PEEK;

FIG. 3 depicts preparation of aminated and sulfonated PEEK from sulfonated and nitrated PEEK; and FIG. 4 depicts structural units of polymers having aryl backbone chains.

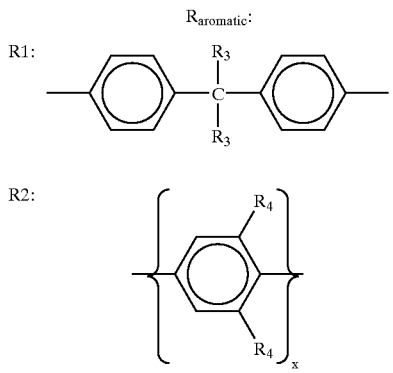
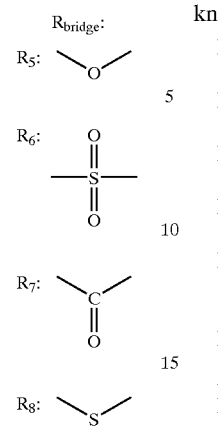

DETAILED DESCRIPTION OF THE INVENTION

The Object Achieved by the Invention and the Improvement as Compared to the State of the Art Preparation of a Nitrated Aryl Polymer When trying to nitrate poly(etheretherketone)(PEEK) by dissolving PEEK in concentrated (90 to 100% by weight) sulfuric acid and subsequently adding dropwise 70–100% by weight nitric acid (FIG. 1) and reacting at room temperature, it has surprisingly been found that the polymer has only been nitrated but not sulfonated. In this process only inexpensive bulk chemicals such as sulfuric acid and nitric acid are employed.

Preparation of a Sulfonated and Nitrated Aryl Polymer

It was surprisingly found that a sulfonated and nitrated aryl polymer, e.g., a sulfonated and nitrated PEEK, can be prepared very simply via either of two methods:

Initially the polymer, e.g., PEEK, is dissolved in concentrated (90–100%) sulfuric acid at room temperature and an amount of concentrated (70–100%) nitric acid to nitrate the polymer is added. Only nitration occurs. Subsequently, the polymer is isolated by precipitation in water, the acid is removed by washing, and the polymer is dried until its weight is constant. Thereafter, it is redissolved in concentrated sulfuric acid (90–100%) and heated to 60° C. with stirring. It is stirred at this temperature for a predetermined time sufficient to sulfonate the polymer. Subsequently, the polymer is precipitated in water, the acid is removed by washing, and the polymer is dried until its weight is constant.

The polymer is dissolved in concentrated sulfuric acid. Thereafter, the desired amount of nitric acid is added dropwise. After a predetermined stirring time the reaction temperature is raised to 60° C. Then the solution is stirred for a predetermined time. Thereafter, the polymer is worked up as stated above. The process is schematically illustrated in FIG. 2.

The process produces nitrated and sulfonated polymers wherein the degree of nitration (i.e., number of $NO_2$) per polymer repeating unit is from 0.1 and 2 and the degree of sulfonation (i.e., number of $SO_3H$ groups) per polymer repeating unit is 0.1 to 2.

The amount of nitration and sulfonation of the resulting polymers can vary from 1% $SO_3H$ and 99% $NO_2$ to 99% $SO_3H$ and 1% $NO_2$, with the degree of modification varying (independently) from 0.1 $SO_3H$ and $NO_2$ to 2 $SO_3H$ and $NO_2$ groups per repeating unit of the polymer.

Suitable starting polymers include inter alia the following known polymers:
  poly(etheretherketone) PEEK Victrex® ($[R_5—R_2—R_5—R_2—R_7]_n$; R2: x=1, $R_4$=H);
  poly(ethersulfone) PES Udel® ($[R1—R_5—R_2—R_6—R_2—R_5]_n$; R1: $R_3$=methyl, R2: x=1, $R_4$=H);
  poly(ethersulfone) PES VICTREX® ($[R_2—R_6—R_2—R_5]_n$; R2: x=1, $R_4$=H);
  poly(etherethersulfone) RADEL R® ($[(R_2—R_5)_2—R_2—R_6—R_2]_n$; R2: x=2, $R_4$=H);
  poly(phenylsulfone) RADEL A® ($[R_5—R_2—R_5—R_2—R_6]_n—[R_5—R_2—R_6—R_2]_m$; R2: x=1, $R_4$=H, n/m=0.18);
  poly(phenylene sulfide) PPS ($[R2—R_8]_n$; R2: x=1, $R_4$=H);
  poly(phenylene oxide) PPO ($[R2—R_5]_n$; $R_4$=$CH_3$); and
  polyphenylene Poly-X 2000 ($[R2]_n$, $R_{4(1)}$=H, $R_{4(2)}$=4-phenoxybenzoyl).

Animation of a Sulfonated and Nitrated Aryl Polymer

It has surprisingly been found that a sulfonated and nitrated PEEK can be reduced by a process [Ref. 4] suitable for the reduction of nitrated to aminated polymers to yield an aminated and sulfonated PEEK containing primary amino groups. Said process is schematically illustrated in FIG. 3.

In order to carry out the reduction, the sulfonated and nitrated polymer may be dissolved in a dipolar-aprotic solvent, for example, N-methylpyrrolidone (NMP), N,N-dimethylacetamide (DMAc), N,N-dimethylformamide (DMF), dimethylsulfoxide (DMSO) or sulfolane, and the nitro groups are reduced using a low valence sulfur-containing salt, such as sodium dithionite.

In additional steps, the primary amino groups of the aminated and sulfonated polymer formed can be alkylated to secondary or tertiary amines and quaternary ammonium groups (salts) by conventional alkylating agents, employing known methods.

In a further aspect of the invention, the sulfonated and nitrated polymers, as well as the aminated and sulfonated polymers (both those containing primary amino groups, as well as those containing amino groups that have been alkylated to secondary or tertiary amines or quaternary ammonium groups (salts) of the invention can be combined with additional polymers to form polymer blends for further use. Such additional polymers may be selected inter alia from among polyimides, polyetherimides, polyamides, polyethersulfones and polyphenylene oxides.

The above polymers of the invention, as well as the polymer blends, may be made into dense or porous sheet membranes using conventional methods. The polymers and polymer blends may be converted into asymmetrical, porous capillary membranes using known processes.

For example, membranes may be prepared by dissolving one or more polymers of the invention, optionally with an additional polymer as above, simultaneously or sequentially in a dipolar-aprotic solvent, such as DMF, DMAc, NMP, DMSO, or sulfolane, filtering and degassing the polymer solution and spreading the polymer solution on a support. The support may be a glass plate, a metal plate, fabric or a web. Subsequently, the solvent is removed by heating the polymer film to 80 to 130° C. and/or applying reduced pressure or in a circulating air dryer. The dried polymer film is optionally removed from the support and treated in a diluted mineral acid, in particular a mineral acid having a concentration of 1 to 70% by weight, followed by deionized water at a temperature of room temperature to 95° C.

The invention may be better understood by reference to the following non-limiting examples that set forth various embodiments.

EXAMPLE 1

Preparation of Nitrated PEEK and PES

A three-neck glass flask equipped with a stirrer and a dropping funnel was charged with 96% $H_2SO_4$. Subsequently, PEEK or PES was dissolved in the sulfuric acid with stirring at room temperature. Thereafter, 70% $HNO_3$ was added dropwise to the reaction solution. The solution was stirred for 3 h. Thereafter, the polymer was precipitated in totally desalted $H_2O$, and the acid was removed by washing. In each case a yield exceeding 90% by weight was obtained. In Table 1 some of the batches are listed.

TABLE 1

Nitration of PEEK and PES

| Ret. no. | Polymer and amount [g] | Dissolving temperature [° C.] | $H_2SO_4$[ml] | $HNO_3$[ml] | Reaction temperature [° C.] | Degree of nitration [%]* |
|---|---|---|---|---|---|---|
| PEEK-$NO_2$-1 | PEEK 26.6 | 25 | 150 | 10 | 25 | 30 |
| PEEK-$NO_2$-2 | PEEK 26.6 | 25 | 150 | 3 | 25 | 18.6 |
| PES-$NO_2$-1 | PES 21.4 | 25 | 150 | 6 | 60 | 68.5 |

*% of polymer repeating units, determined by elementary analysis

EXAMPLE 2

Preparation of Nitrated and Sulfonated PEEK

In a three-neck stirring device, 24 g of the nitrated PEEK obtained in Example 1 (sample PEEK-$NO_2$-2) is dissolved in 150 ml of 96% sulfuric acid. After dissolution the reaction temperature is raised to 60° C. and the reaction mixture is stirred. Samples are taken from the reaction mixture in predetermined intervals; the samples are precipitated, freed from acid by washing, dried, and analyzed with regard to the degree of sulfonation by titration. The characteristics of the polymer samples taken after different reaction times are listed in table 2.

TABLE 2

Sulfonation of Nitrated PEEK

| Sample no. | Reaction time [min] | IEC [meq $SO_3H$/g] |
|---|---|---|
| PKNS-1 | 170 | 0.78 |
| PKNS-2 | 240 | 0.82 |
| PKNS-3 | 325 | 0.96 |
| PKNS-4 | 360 | 1.45 |

EXAMPLE 3

Preparation of Animated and Sulfonated PEEK 5 g nitrated and sulfonated PEEK (PKNS-4) is dissolved in 100 ml of DMF in a three-neck glass stirring device. Subsequently, 8 g of sodium dithionite is added to the reaction mixture. Thereafter, the temperature is increased to 150° C. and the reaction mixture is stirred at this temperature for 6 h. Then, the solution is filtrated, and after cooling the reaction mixture is precipitated in an HCl/methanol mixture (mixing ratio methanol: 37% hydrochloric acid=8:2). The precipitated polymer is washed with totally desalted water several times and dried.

The polymer has an ion-exchange capacity of 1.27 meq $SO_3H$/g of polymer.

EXAMPLE 4

Preparation of Membranes from Nitrated and Sulfonated PEEK and the Characterization Thereof In order to prepare a cation-exchange membrane, 3 g of the polyetheretherketone modified according to the process of Example 2 was dissolved in NMP. The prepared polymer solution was filtered off. The transparent solution was knife-coated on a glass plate. Thereafter, the glass plate with the film was placed into an oven and the solvent was evaporated off at 120° C. The membrane was removed from the glass plate, and the characteristics thereof relevant for its use in an electromembrane process (ion-exchange capacity IEC, surface resistance $R_a(H^+/Na^+)$, and pernselectivity PS) were determined in experiments.

The results of the characterization are listed in table 3. It can be seen from table 3 that the characteristics of the newly developed membranes are comparable with those of commercial cation-exchange membranes [Ref. 7].

TABLE 3

Preparation and Characterization of the Membrane

| Sample no. | Substance | Solvent | IEC (meq/g) | d (im) | $R_a(½cm^2)H^+/Na^+$ | PS (%) |
|---|---|---|---|---|---|---|
| MPKNS1 | PKNS-1 | NMP | 0.78 | 28 | 0.979/6.12 | 98 |
| MPKNS2 | PKNS-2 | NMP | 0.82 | 17 | 0.426/3.05 | 98 |
| MPKNS3 | PKNS-3 | NMP | 0.96 | 26 | 0.180/1.01 | 97 |
| MPKNS4 | PKNS-4 | NMP | 1.45 | 35 | 0.093/0.53 | 98 |

Remarks:
d=membrane thickness
$R_a$(½ cm²) H⁺/Na⁺=surface resistance of the membrane, measured in 0.5 $H_2SO_4$ and 0.5 NaCl by impedance spectroscopy.
PS=permselectivity, measured in a 0.1 N/0.5 N NaCl solution.

EXAMPLE 5

Application Test within a PEM Fuel Cell

The MPKNS4 membrane of Example 4 was installed in a PEM fuel cell provided by the Institut für Verfahrenstechnik of the University of Stuttgart. Commercial e-tek electrodes were cold-pressed onto the membrane. The pressure at the $H_2$ side was 2.1 bar, the $O_2$ pressure was 2.3 bar. The temperature of the cell was from 60 to 80° C. The performance data of the PEM fuel cells were: a voltage of 700 mV at a current density of 120 mA/cm². The membrane turned out to be stable up to a temperature of 60 to 80° C. during a durability test over a period of 600 h.

Each of the references cited herein is incorporated by reference in its entirety.

REFERENCES CITED

[1] R. J. Karcha, R. S. Porter, J. Macromol. Sci.- Pure Appl. Chem., A32(5),957–967 (1995)
[2] G. C. Corfield, G. W. Wheatley, D. G. Parker, J. Polym. Sci.: Part A: Polymer Chem., 30, 845–849 (1992)
[3] F. Helmer-Metzmann, et al., European Patent Application EP 0 574 791 A2 (1993)
[4] H. A. Naik, I. W. Parsons, Polymer, 32, 140 (1991)
[5] J. V. Crivello, J. Org. Chem., 46, 3056 (1981)
[6] W. H. Daly, S. Lee, C. Rungaroonthaikul, in Chemical Reactions in Polymers, J. L. Benham and J. F. Kinstle (eds.), ACS Symp. Ser., 364 (1988)
[7] "8th European Summer School in Membrane Science", Sep. 17–21, 1990, Villa Feltrinelli, Gargnano-Italy

I claim:

1. A sulfonated and nitrated polymer having an aryl backbone comprising a plurality of aryl moieties selected from the group consisting of R1, R2, and mixtures thereof, said aryl moieties being connected by bridging moieties selected from the group consisting of $R_5$, $R_6$, $R_7$ and $R_8$; wherein

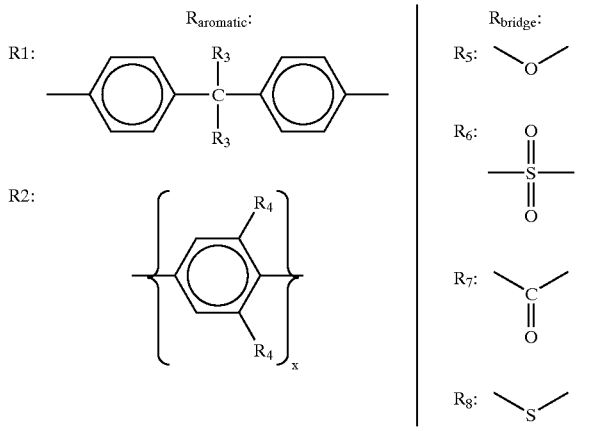

wherein $R_3$ and $R_4$ are each selected from the group consisting of H, methyl, and 4-phenoxybenzoyl, and wherein x is 1 or 2, said polymer having at least a portion of the aryl groups of the backbone substituted with —$SO_3H$ and at least a portion of the aryl groups of the backbone substituted with —$NO_2$.

2. The polymer having an aryl backbone chain according to claim 1, wherein said polymers are selected from the group consisting of:

poly(etheretherketone) having an aryl backbone comprising $[R_5—R2—R_5—R2—R_7]_n$, wherein for the R2 moiety, x=1 and $R_4$=H;

poly(ethersulfone) having an aryl backbone comprising $[R1—R_5—R2—R_6—R2—R_5]_n$, wherein for the R1 moiety, $R_3$=methyl, and for the R2 moiety, x=1 and $R_4$=H;

poly(ethersulfone) having an aryl backbone comprising $[R2—R_6—R2—R_5]_n$, wherein for the R2 moiety, x=1 and $R_4$=H;

poly(etherethersulfone) having an aryl backbone comprising $[(R3—R_5)_2—R2—R_6—R2]_n$, wherein for the R2 moiety, x=2 and $R_4$=H;

poly(phenylsulfone) having an aryl backbone comprising $[R_5—R2—R_5—R2—R_6]_n—[R_5—R2—R_6—R2]_m$, wherein for the R2 moiety, x=1 and $R_4$=H, and wherein n/m=0.18;

poly(phenylene sulfide) having an aryl backbone comprising $[R2—R_8]_n$, wherein for the R2 moiety, x=1 and $R_4$=H;

poly(phenylene oxide) having an aryl backbone comprising $[R2—R_5]_n$, wherein for the R2 moiety, $R_4$=$CH_3$; and polyphenylene having an aryl backbone comprising $[R2]_n$, wherein for the R2 moiety, $R_{4(1)}$=H and $R_{4(2)}$=4-phenoxybenzoyl.

3. The polymer having an aryl backbone chain according to claim 1, wherein the polymer is selected from PEEK or PES.

4. The polymer having an aryl backbone chain according to claim 1 wherein the degree of nitration per polymer repeating unit is from 0.1 to 2 and the degree of sulfonation per polymer repeating unit is from 0.1 to 2.

5. The polymer having an aryl backbone chain according to claim 1, wherein the polymer comprises from 1% of $SO_3H$ and 99% of $NO_2$ to 1% of $NO_2$ and 99% of $SO_3H$ and the degree of modification of the polymer comprises from 0.1 $SO_3H$ and $NO_2$ groups per polymer repeating unit to 2 $SO_3H$ and $NO_2$ groups per repeating unit of the polymer.

6. A process for the preparation of a polymer having aryl backbone chains, comprising dissolving a non-sulfonated and non-nitrated polymer having aryl backbone chains and the structural elements according to claim 1 in sulfuric acid, adding 70 to 100% nitric acid and reacting the mixture at room temperature to form a nitrated polymer.

7. The process for the preparation of a sulfonated and nitrated polymer having aryl backbone chains according to claim 6, further comprising redissolving the nitrated polymer in sulfuric acid and sulfonating the polymer at a temperature at or above 60° C. to form a nitrated and sulfonated polymer.

8. The process for the preparation of a nitrated and sulfonated polymer having aryl backbone chains, comprising dissolving a non-sulfonated and non-nitrated polymer having an aryl backbone chain and the structural units according to claim 1 in a reaction mixture comprising 90 to 100% sulfuric acid and an amount of 70–100% nitric acid sufficient for nitration, and adjusting the reaction temperature, such that nitration and sulfonation of the polymer occurs simultaneously or in immediately successive steps.

9. A process for the preparation of an aminated and sulfonated polymer having an aryl backbone chains according to claim 1, comprising treating the polymer with a reducing agent under conditions such that the $NO_2$ groups on polymer are reduced to primary amino groups.

10. The process according to claim 9, wherein the sulfonated and nitrated polymer is dissolved in an dipolar-aprotic solvent, and the nitro groups of the polymer are reduced to primary amino groups by sodium dithionite.

11. The process according to claim 9, further comprising alkylating the primary amino groups of the polymer to secondary or tertiary amines or quaternary ammonium groups.

12. The process according to claim 11 wherein the primary amino groups of the polymer are alkylated to quaternary ammonium groups.

13. An aminated and sulfonated polymer obtained by the process of any one of claims 9 to 12.

14. A polymer blend comprising a polymer of claim 1 and an additional polymer selected from the group consisting of polyimides, polyetherimides, polyamides, polyethersulfones, and polyphenylene oxides.

15. A polymer blend comprising a polymer of claim 13 and an additional polymer selected from the group consisting of polyimides, polyetherimides, polyamides, polyethersulfones, and polyphenylene oxides.

16. A membrane comprising a polymer of claim 1.

17. A membrane comprising a polymer of claim 13.

18. A membrane comprising a polymer blend of claim 14.

19. A membrane comprising a polymer blend of claim 15.

20. A process for preparing a polymer membrane comprising dissolving a polymer of claim 13 in a dipolar-aprotic solvent to form a polymer solution, filtering and degassing the polymer solution, spreading a thin film of the polymer solution on a support, removing the solvent and treating the thin film of polymer in a dilute mineral acid and deionized water at a temperature of from room temperature to 95° C.

21. The process of claim 20 wherein the polymer comprises a polymer blend.

22. The process of claim 20 wherein the solvent is selected from the group consisting of DMF, DMAc, NMP, DMSO and sulfolane.

23. The process of claim 20 wherein the membrane is removed from the support.

24. The process of claim 20 wherein the dilute mineral acid has a concentration from 1 to 70% by weight.

25. A fuel cell comprising a membrane according to claim 17.

26. A fuel cell comprising a membrane according to claim 19.

* * * * *

UNITED STATES PATENT AND TRADEMARK OFFICE
CERTIFICATE OF CORRECTION

PATENT NO. : 6,509,441 B1
DATED : January 21, 2003
INVENTOR(S) : Jochem Kerres

It is certified that error appears in the above-identified patent and that said Letters Patent is hereby corrected as shown below:

Title page,
Item [73], Assignee, "Universitat" should read -- Universität --; and "Stuttgard" should read -- Stuttgart --

Column 1,
Line 9, "are" should read -- is --
Line 18 "are" should read -- is --

Column 2,
Line 9, "R8;" should read -- $R_8$, --
Line 30, "$R_4H$," should read -- $R_4=H$, --

Column 3,
Lines 1-19, delete all formulae (lines 1-19)

Column 4,
Line 19, "Animation" should read -- Amination --

Column 5,
Line 53, "Animation" should read -- Amination --

Column 6,
Line 47, "pernselectivity" should read -- permselectivity --
Table 3, "(im)" should read -- ($\mu$m) --

Column 7,
Line 44, "$R_8$;" should read -- $R_8$, --

UNITED STATES PATENT AND TRADEMARK OFFICE
CERTIFICATE OF CORRECTION

PATENT NO.   : 6,509,441 B1
DATED        : January 21, 2003
INVENTOR(S)  : Jochem Kerres It is certified that error appears in the above-identified patent and that said Letters Patent is hereby corrected as shown below:

Column 8,
Line 17, "R3" should read -- R2 --
Line 30, "[$R_2$]" should read -- [$R_2$]$_n$, --
Line 31, "$_n$," should be deleted Column 9,
Line 2, "chains" should read -- chain --

Signed and Sealed this

Twelfth Day of August, 2003

JAMES E. ROGAN
*Director of the United States Patent and Trademark Office*